(12) United States Patent
Kaplanyan et al.

(10) Patent No.: US 11,113,800 B2
(45) Date of Patent: Sep. 7, 2021

(54) FILTERING IMAGE DATA USING A NEURAL NETWORK

(71) Applicant: NVIDIA Corporation, Santa Clara, CA (US)

(72) Inventors: Anton S. Kaplanyan, Kirkland, WA (US); Chakravarty Reddy Alla Chaitanya, Montreal (CA); Timo Oskari Aila, Tuusula (FI); Aaron Eliot Lefohn, Kirkland, WA (US); Marco Salvi, Kirkland, WA (US)

(73) Assignee: NVIDIA CORPORATION, Santa Clara, CA (US)

(*) Notice: Subject to any disclaimer, the term of this patent is extended or adjusted under 35 U.S.C. 154(b) by 100 days.

(21) Appl. No.: 15/872,838

(22) Filed: Jan. 16, 2018

(65) Prior Publication Data

US 2018/0204314 A1    Jul. 19, 2018

Related U.S. Application Data

(60) Provisional application No. 62/447,859, filed on Jan. 18, 2017.

(51) Int. Cl.
*G06K 9/62*    (2006.01)
*G06T 5/20*    (2006.01)
(Continued)

(52) U.S. Cl.
CPC ............ *G06T 5/20* (2013.01); *G06K 9/00986* (2013.01); *G06K 9/6273* (2013.01); *G06K 9/66* (2013.01);
(Continued)

(58) Field of Classification Search
CPC . G06T 5/20; G06T 5/002; G06T 11/60; G06T 2207/20182; G06T 2207/10024; G06T 2207/10016; G06K 9/66
See application file for complete search history.

(56) References Cited

U.S. PATENT DOCUMENTS 5,699,487 A * 12/1997 Richardson ............ G11B 5/09
706/20
6,313,838 B1 * 11/2001 Deering ................. G06T 15/00
345/420
(Continued)

FOREIGN PATENT DOCUMENTS

CN    102663438 A    9/2012
CN    104506162 A    4/2015
(Continued)

OTHER PUBLICATIONS

Non-Final Office Action from U.S. Appl. No. 15/874,611, dated Sep. 4, 2019.
(Continued)

*Primary Examiner* — Solomon G Bezuayehu
(74) *Attorney, Agent, or Firm* — Zilka-Kotab, P.C.

(57) ABSTRACT

A method, computer readable medium, and system are disclosed for performing spatiotemporal filtering. The method includes identifying image data to be rendered, reconstructing the image data to create reconstructed image data, utilizing a filter including a neural network having one or more skip connections and one or more recurrent layers, and returning the reconstructed image data.

20 Claims, 10 Drawing Sheets

(51) Int. Cl.
  *G06T 11/60* (2006.01)
  *G06K 9/66* (2006.01)
  *G06K 9/00* (2006.01)
  *G06T 1/20* (2006.01)
  *G06T 5/00* (2006.01)

(52) U.S. Cl.
  CPC .............. *G06T 1/20* (2013.01); *G06T 5/002* (2013.01); *G06T 11/60* (2013.01); *G06T 2207/10016* (2013.01); *G06T 2207/10024* (2013.01); *G06T 2207/10028* (2013.01); *G06T 2207/20081* (2013.01); *G06T 2207/20084* (2013.01); *G06T 2207/20182* (2013.01)

(56) References Cited

U.S. PATENT DOCUMENTS

| | | | |
|---|---|---|---|
| 6,330,702 B1* | 12/2001 | King | G06F 7/026 714/819 |
| 7,522,769 B2* | 4/2009 | Harville | G06K 9/00234 382/162 |
| 7,788,196 B2 | 8/2010 | Buscema | |
| 9,978,177 B2* | 5/2018 | Mehr | G06F 17/10 |
| 10,176,388 B1* | 1/2019 | Ghafarianzadeh | G06N 3/0454 |
| 10,534,970 B2* | 1/2020 | Laschi | G06K 9/2036 |
| 10,552,667 B1* | 2/2020 | Bogan, III | G06K 9/6262 |
| 10,600,167 B2 | 3/2020 | Schied et al. | |
| 2005/0276469 A1 | 12/2005 | Kim | |
| 2006/0018562 A1 | 1/2006 | Ruggiero | |
| 2008/0162743 A1* | 7/2008 | Riener | G06F 7/766 710/30 |
| 2008/0232682 A1* | 9/2008 | Eswaran | G06K 9/628 382/159 |
| 2009/0167763 A1* | 7/2009 | Waechter | G06T 17/005 345/426 |
| 2010/0183217 A1 | 7/2010 | Seung et al. | |
| 2012/0057783 A1 | 3/2012 | Yamada | |
| 2013/0245462 A1 | 9/2013 | Capdevila et al. | |
| 2014/0139643 A1 | 5/2014 | Hogasten et al. | |
| 2014/0279771 A1 | 9/2014 | Golovashkin et al. | |
| 2014/0314310 A1 | 10/2014 | Movellan et al. | |
| 2014/0354675 A1 | 12/2014 | Lottes | |
| 2015/0310309 A1* | 10/2015 | Gopalan | G06K 9/6267 382/199 |
| 2015/0317511 A1* | 11/2015 | Li | G06K 9/00268 382/118 |
| 2015/0379727 A1* | 12/2015 | Golas | G06T 7/337 382/103 |
| 2016/0026899 A1 | 1/2016 | Wang et al. | |
| 2016/0098820 A1 | 4/2016 | Rousselle et al. | |
| 2016/0140421 A1 | 5/2016 | Edpalm et al. | |
| 2016/0210778 A1* | 7/2016 | Zimmer | G06T 5/002 |
| 2016/0292589 A1 | 10/2016 | Taylor, Jr. et al. | |
| 2016/0321523 A1 | 11/2016 | Sen et al. | |
| 2016/0343117 A1* | 11/2016 | Schultz | G06T 5/20 |
| 2016/0358068 A1 | 12/2016 | Brothers et al. | |
| 2016/0358069 A1 | 12/2016 | Brothers et al. | |
| 2016/0358072 A1 | 12/2016 | Hermann et al. | |
| 2016/0358321 A1 | 12/2016 | Xu et al. | |
| 2017/0061582 A1 | 3/2017 | Lim et al. | |
| 2017/0103264 A1 | 4/2017 | Javan Roshtkhari et al. | |
| 2017/0200063 A1 | 7/2017 | Nariyambut Murali et al. | |
| 2017/0213082 A1* | 7/2017 | Kumar | G06K 9/00442 |
| 2017/0243352 A1* | 8/2017 | Kutliroff | G06T 19/006 |
| 2018/0018805 A1* | 1/2018 | Kutliroff | G06T 7/90 |
| 2018/0025257 A1* | 1/2018 | van den Oord | G06N 3/0445 375/240.14 |
| 2018/0121790 A1* | 5/2018 | Kim | G06N 3/063 |
| 2018/0144241 A1* | 5/2018 | Liu | G06N 3/08 |
| 2018/0204307 A1 | 7/2018 | Schied et al. | |
| 2018/0293711 A1 | 10/2018 | Vogels et al. | |
| 2019/0258907 A1* | 8/2019 | Rezende | G06N 3/0445 |
| 2019/0287226 A1* | 9/2019 | Holub | G06T 1/0064 |
| 2019/0362546 A1* | 11/2019 | Wayenberg | G06T 19/20 |

FOREIGN PATENT DOCUMENTS

| | | |
|---|---|---|
| CN | 105787892 A | 7/2016 |
| CN | 105868829 A | 8/2016 |
| CN | 106127684 A | 11/2016 |
| CN | 106204468 A | 12/2016 |
| CN | 106204489 A | 12/2016 |
| CN | 106251303 A | 12/2016 |
| CN | 106709568 A | 5/2017 |
| CN | 106991646 A | 7/2017 |
| EP | 3101597 A2 | 12/2016 |
| TW | 201138468 A | 11/2011 |
| WO | 2017091833 A1 | 6/2017 |
| WO | 2017132288 A1 | 8/2017 |

OTHER PUBLICATIONS

Schied et al., U.S. Appl. No. 15/874,611, filed Jan. 18, 2018.
Dammertz et al., "Edge-Avoiding À-Trous Wavelet Transform for fast Global Illumination Filtering," High Performance Graphics, 2010, pp. 1-10.
Kalantari et al., "Removing the Noise in Monte Carlo Rendering with General Image Denoising Algorithms," Eurographics, vol. 32, No. 2, 2013, pp. 1-10.
Li et al., "SURE-based Optimization for Adaptive Sampling and Reconstruction," ACM Transactions on Graphics, vol. 31, No. 6, Nov. 2012, pp. 194:1-194:9.
Mehta et al., "Axis-Aligned Filtering for Interactive Sampled Soft Shadows," ACM Transactions on Graphics, vol. 31, Nov. 2012, pp. 1-10.
Mehta et al., "Axis-Aligned Filtering for Interactive Physically-Based Diffuse Indirect Lighting," ACM Transactions on Graphics, vol. 32, Jul. 2013, pp. 1-11.
Mehta et al., "Factored Axis-Aligned Filtering for Rendering Multiple Distribution Effects," ACM Transactions on Graphics, vol. 33, No. 4, Jul. 2014, pp. 57:1-57:12.
Karis, B., "High-Quality Temporal Supersampling," A course in Advances in Real-Time Rendering in 3D Graphics and Games, Vancouver SIGGRAPH 2014 Courses, 2014, 12 pages retrieved from http://advances.realtimerendering.com/s2014/index.html#_HIGH-QUALITY_TEMPORAL_SUPERSAMPLING.
Karis, B., "High-Quality Temporal Supersampling," SIGGRAPH 2014 Advances in Real-Time Rendering in Games, Course Power Point Presentation, 2014, 55 pages.
Office Action from Taiwanese Application No. 10721221440, dated Dec. 26, 2018.
Yang et al., "Deep Edge Guided Recurrent Residual Learning for Image Super-Resolution," IEEE Transactions on Image Processing, 2017, vol. 26, Issue 12, pp. 1-12.
Yamanaka et al., "Fast and Accurate Image Super Resolution by Deep CNN with Skip Connection and Network in Network," International Conference on Neural Information Processing, Springer, Cham, 2017, pp. 1-9.
Zhao, A., "Image Denoising with Deep Convolutional Neural Networks," Stanford University, 2016, pp. 1-5.
Tong et al., "Image Super-Resolution Using Dense Skip Connections," IEEE International Conference on Computer Vision (ICCV), 2017, pp. 1-9.
Mao et al., "Image Restoration Using Very Deep Convolutional Encoder-Decoder Networks with Symmetric Skip Connections," 2016, 29th Conference on Neural Information Processing Systems (NIPS 2016), pp. 1-9.
Li et al., "Joint Image Filtering with Deep Convolutional Networks," arXiv preprint arXiv:1710.04200, 2017, pp. 1-14.
Bako et al., "Kernel-predicting convolutional networks for denoising Monte Carlo renderings," ACM Transactions on Graphics (TOG), Jul. 2017, vol. 36, No. 4, pp. 1-14.
Tai et al., "MemNet: A Persistent Memory Network for Image Restoration," Proceedings of the IEEE Conference on Computer Vision and Pattern Recognition, 2017, pp. 1-9.
Oord et al., "Pixel Recurrent Neural Networks," arXiv preprint arXiv:1601.06759, 2016, pp. 1-11.

(56) References Cited

OTHER PUBLICATIONS

Kalantari et al., "A Machine Learning Approach for Filtering Monte Carlo Noise," ACM Transactions on Graphics, vol. 34, No. 4, Aug. 2015, pp. 1-12 retrieved from http://cvc.ucsb.edu/graphics/Papers/SIGGRAPH2015_LBF/PaperData/SIGGRAPH15_LBF.pdf.

Mao et al., "Image Restoration Using Convolutional Auto-encoders with Symmetric Skip Connections," Cornell University Library, Aug. 2016, pp. 1-17 retrieved from https://arxiv.org/pdf/1606.08921.pdf.

Huang et al., "Bidirectional Recurrent Convolutional Networks for Multi-Frame Super-Resolution," Advances in Neural Information Processing Systems 28 (NIPS) 2015, pp. 1-9 retrieved from https://papers.nips.cc/paper/5778-bidirectional-recurrent-convolutional-networks-for-multi-frame-super-resolution.pdf.

Notice of Allowance from U.S. Appl. No. 15/874,611, dated Jan. 23, 2020.

Supplemental Notice of Allowance from U.S. Appl. No. 15/874,611, dated Feb. 7, 2020.

Office Action from Chinese Patent Application No. 201810050649.2, dated Jan. 6, 2021.

Office Action from Taiwanese Application No. 11020584420, dated Jun. 21, 2021.

\* cited by examiner

FILTERING IMAGE DATA USING A NEURAL NETWORK

CLAIM OF PRIORITY

This application claims the benefit of U.S. Provisional Application No. 62/447,859 titled "RECONSTRUCTION OF NOISY MONTE CARLO IMAGE SEQUENCES USING A RECURRENT AUTOENCODER AND SPATIOTEMPORAL VARIANCE-GUIDED FILTERING FOR RECONSTRUCTION OF GLOBAL ILLUMINATION IMAGES," filed Jan. 18, 2017, the entire contents of which is incorporated herein by reference.

FIELD OF THE INVENTION

The present invention relates to image rendering, and more particularly to performing reconstruction on sampled images during a rendering process.

BACKGROUND

Reconstructing noisy image data has proven challenging utilizing current techniques. For example, current implementations for performing reconstruction of noisy image data are time-intensive, rely on images with a relatively high sample count, and do not produce a temporally stable result. No current solutions offer a reconstruction method that is time efficient, that can handle initial image data with a small sample count, and that produces temporally stable results.

Thus, there is a need for addressing these issues and/or other issues associated with the prior art.

SUMMARY

A method, computer readable medium, and system are disclosed for performing spatiotemporal filtering. The method includes identifying image data to be rendered, reconstructing the image data to create reconstructed image data, utilizing a filter including a neural network having one or more skip connections and one or more recurrent layers, and returning the reconstructed image data.

DETAILED DESCRIPTION

Figure 1:
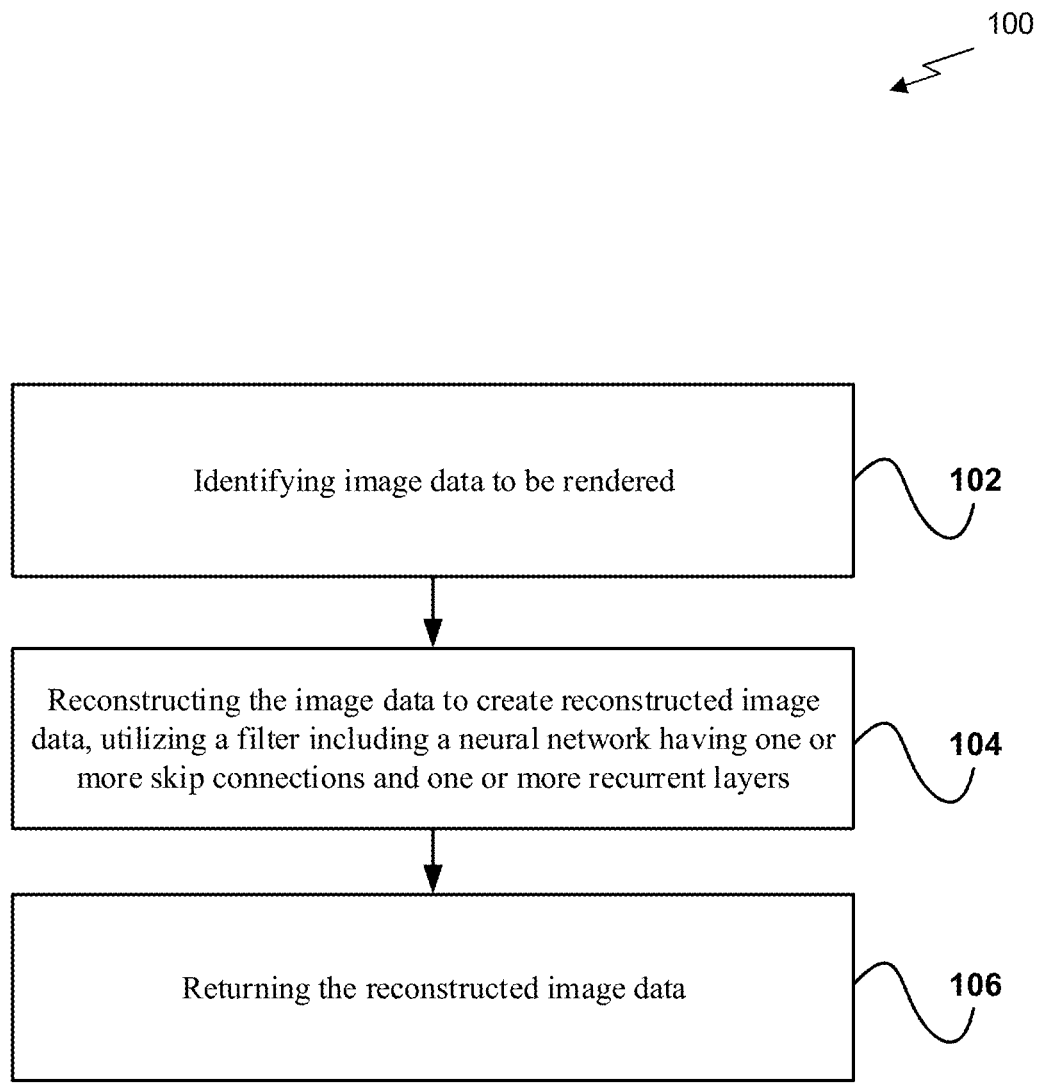
FIG. 1 illustrates a flowchart of a method for filtering image data using a neural network, in accordance with one embodiment.

FIG. 1 illustrates a flowchart of a method 100 for filtering image data using a neural network, in accordance with one embodiment. As shown in operation 102, image data to be rendered is identified. In one embodiment, the image data may include a single image. In another embodiment, the image data may include one of a plurality of image frames (e.g., of video data, etc.). In yet another embodiment, the image data may be created as a result of a predetermined process. For example, the predetermined process may include one or more of low light photography, low light video recording, a Monte Carlo sampling method, photography and/or video creation that produce RGB and depth information, image creation using depth-only cameras (e.g., time-of-flight cameras that produce noisy images/videos), etc. In still another embodiment, the image data may be created by one or more automotive imaging devices (e.g., daytime cameras, night vision cameras, etc.).

Additionally, in one embodiment, the image data may have a number of samples per pixel (spp) below a predetermined threshold. For example, the image data may have a level of noise greater than a predetermined threshold. In another embodiment, the image data may include color data (e.g., RGB data, etc.). In yet another embodiment, the image data may include auxiliary information. For example, the auxiliary information may include one or more view-space shading normals (e.g., a 2D vector, etc.). In another example, the auxiliary information may include one or more depth values. In still another example, the auxiliary information may include one or more roughness values. In yet another embodiment, rendering the image data may include generating a viewable image, utilizing the image data.

Furthermore, as shown in operation 104, the image data is reconstructed to create reconstructed image data, utilizing a filter including a neural network having one or more skip connections and one or more recurrent layers. In one embodiment, reconstructing the image data may include denoising the image data (e.g., reducing noise within the image data, etc.) to create the reconstructed image data. In another embodiment, reconstructing the image data may include completing and/or correcting the image data to create the reconstructed image data. For example, the neural network may be trained using a predetermined number of natural images, and may take the image data as input and complete and/or correct the image data to create the reconstructed image data to look locally like portions of the training images.

In yet another embodiment, the neural network may include a plurality of convolution layers (e.g., stages, etc.). In still another embodiment, the neural network may include an autoencoder. For example, the neural network may include an autoencoder that learns to reconstruct its inputs. In another embodiment, the auxiliary information may be passed through the autoencoder unchanged.

Further still, in one embodiment, the one or more skip connections may enable the avoidance of one or more layers of the neural network, during the reconstructing. For example, the neural network may include a plurality of encoder layers and corresponding decoder layers. In another example, a skip connection within the neural network may enable a reconstruction process to jump from an encoder layer directly to a corresponding decoder layer, thereby skipping over one or more encoder and decoder layers within the neural network.

Also, in one embodiment, the one or more recurrent layers may include a recurrent convolutional neural network (RCNN). For example, one or more feedback loops may be implemented via one or more recurrent layers that connect an output of previous states (e.g., earlier frames of image data, etc.) into current states. In another example, this may enable the retention of information (e.g., auxiliary information, etc.) between input image data (e.g., between frames of image data, etc.).

For example, information (e.g., auxiliary information, color information, state information, etc.) used during a reconstruction of a first frame of a sequence of frames of the image data may be stored as a hidden, recurrent state. This state may then be accessed during a reconstruction of a second frame of the sequence of frames of the image data within the RCNN, utilizing a feedback loop of the RCNN.

In addition, in one embodiment, the one or more recurrent layers may link a layer to itself within the neural network. For example, this may implement a short-term memory within the neural network (e.g., by allowing the neural network to retain state information between image frames, etc.). In another example, this may increase a temporal stability/consistency of the reconstructed image data (e.g., by reducing temporal issues such as flickering, etc.).

Furthermore, in one embodiment, the neural network may be trained, utilizing a data set including a plurality of input/output pairs. For example, the training may include learning a mapping from noisy input image data to noise-free output image data. In another example, each input/output pair may include input image data (e.g., low-quality image data (e.g., noisy image data having a number of samples per pixel below a predetermined threshold, etc.) that is desired to be converted), as well as pre-rendered output data (a high-quality reference image obtained using a costly rendering process (e.g., utilizing a number of samples per pixel above a predetermined threshold, etc.). In yet another example, the training may include weighting each layer within the neural network in order to find a function that consistently maps the input of an input/output pair to the output of the input/output pair.

Further still, in one embodiment, a loss function may be utilized during the training of the neural network. In one embodiment, the loss function may define how an error between actual neural network outputs and training outputs is calculated during the training.

As a result, the reconstructed image data may have less noise than the input image data.

Further, as shown in operation 106, the reconstructed image data is returned. In one embodiment, the reconstructed image data may be output (e.g., displayed as a viewable image, etc.). In another embodiment, the reconstructed image data may be passed to one or more additional filters (e.g., within a rendering process, etc.).

In this way, image data may be reconstructed during rendering using an autoencoder having skip connections and recurrent layers. Additionally, Monte Carlo sampling data may be reconstructed using a neural network.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
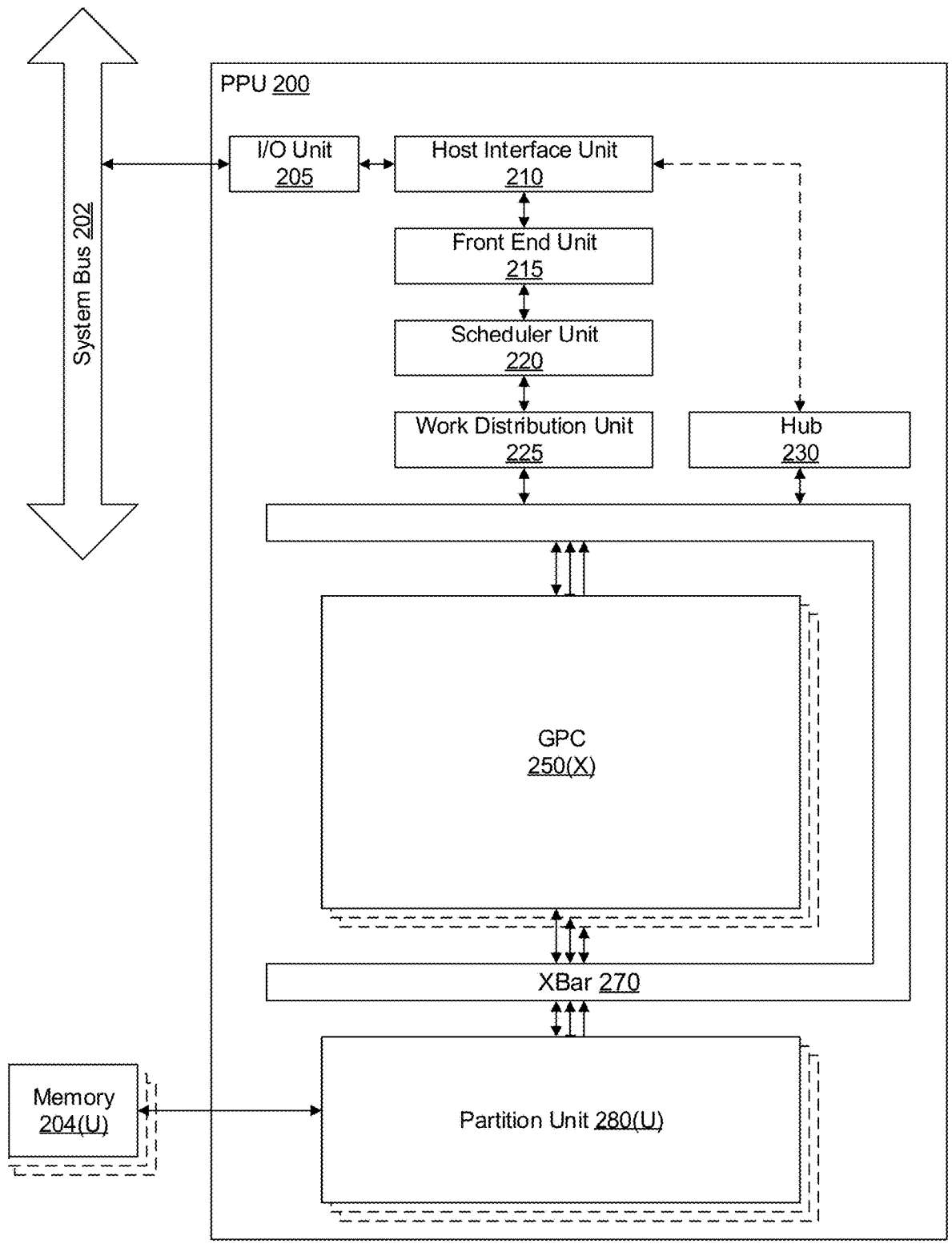
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
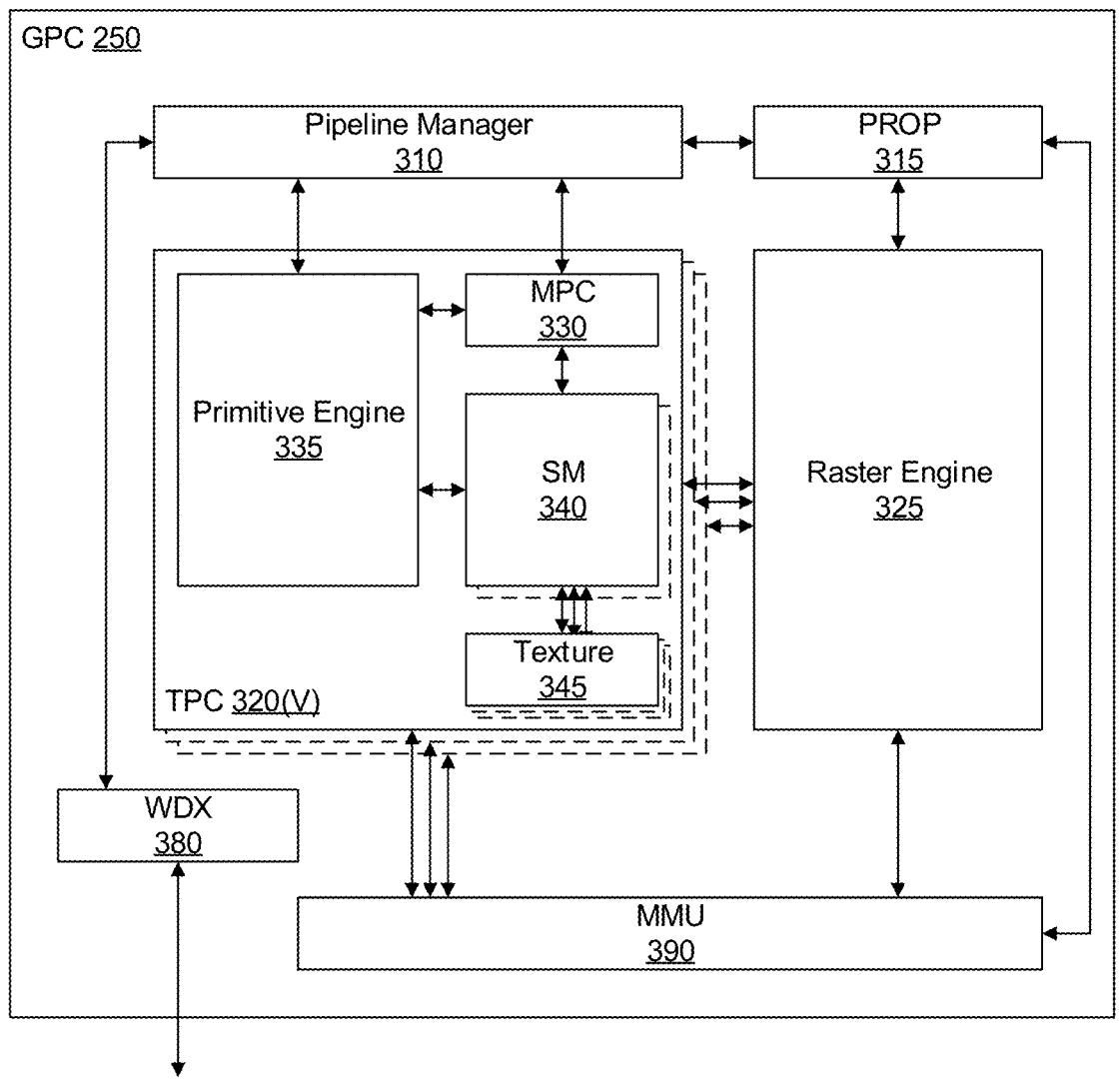
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
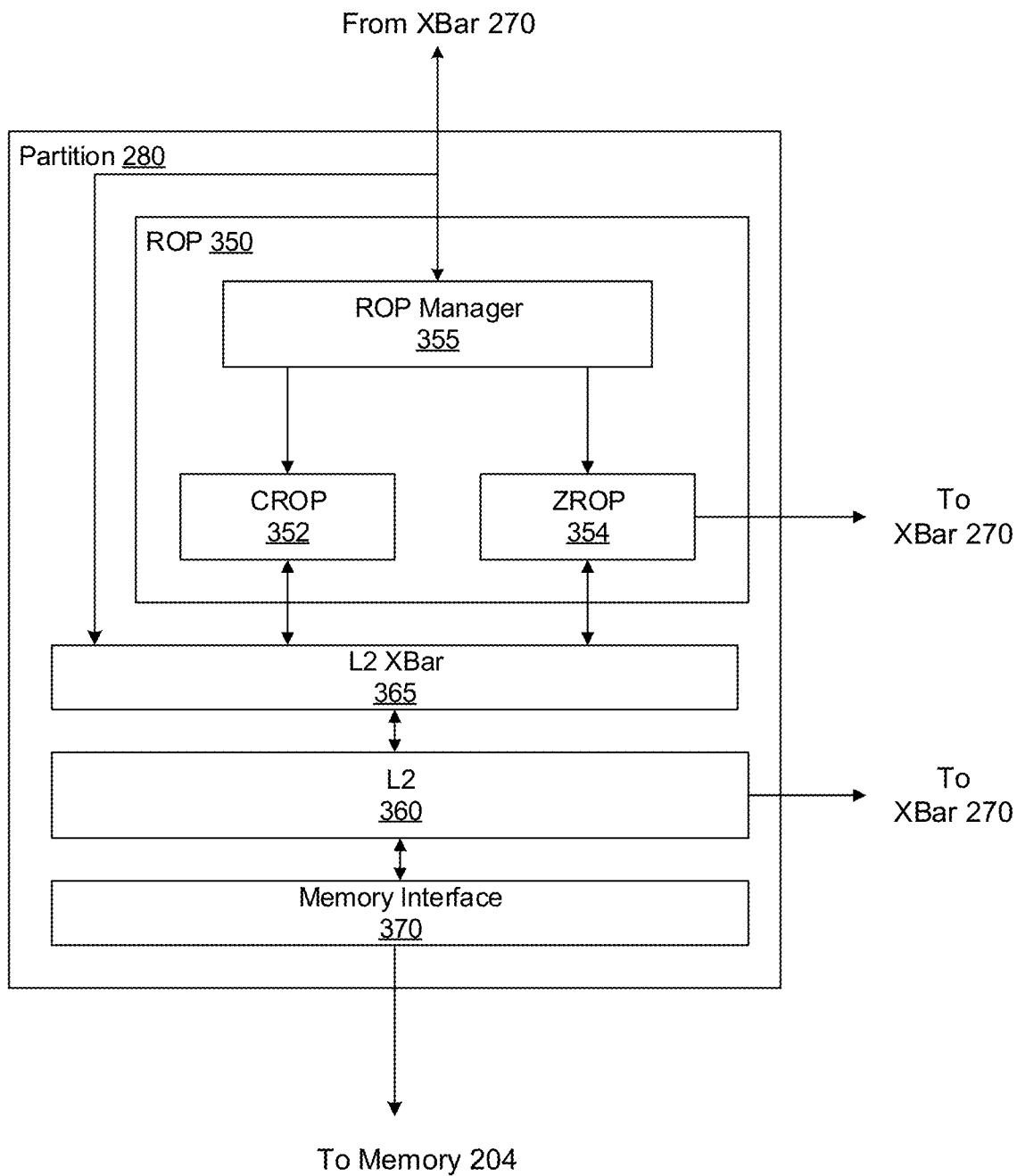
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
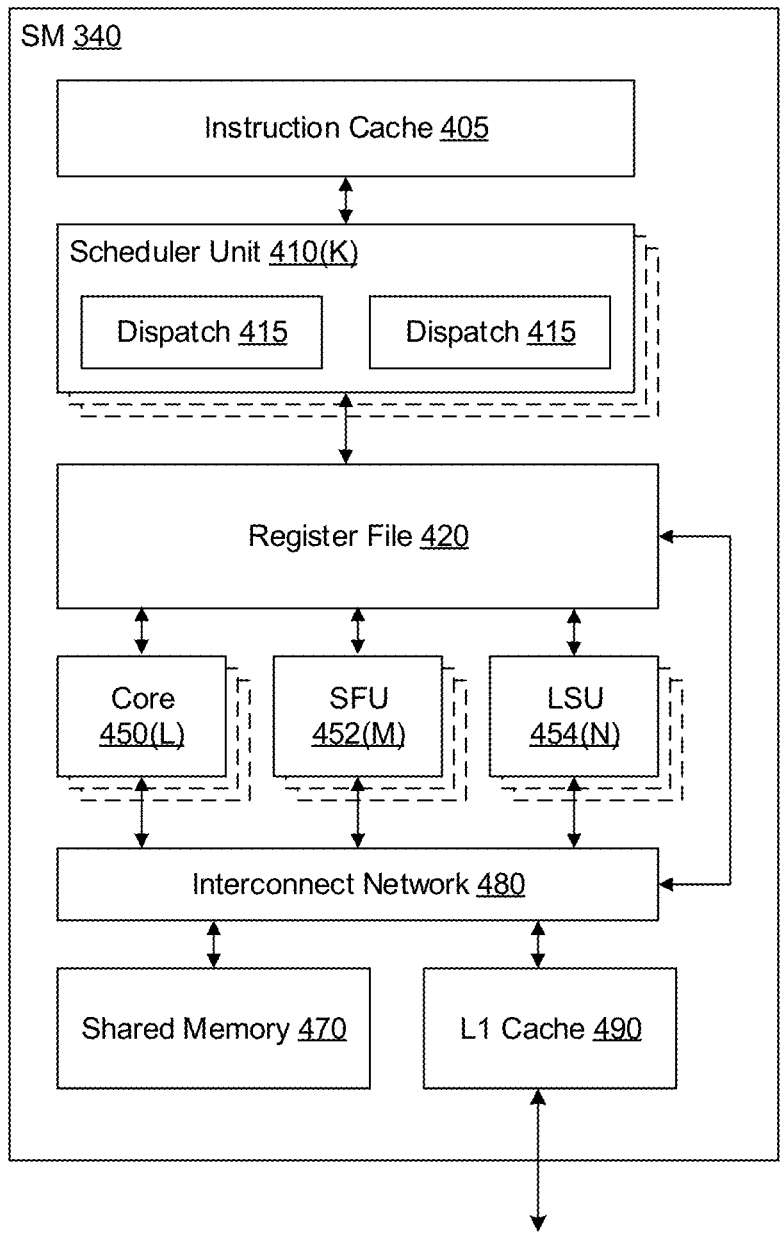
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 to communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
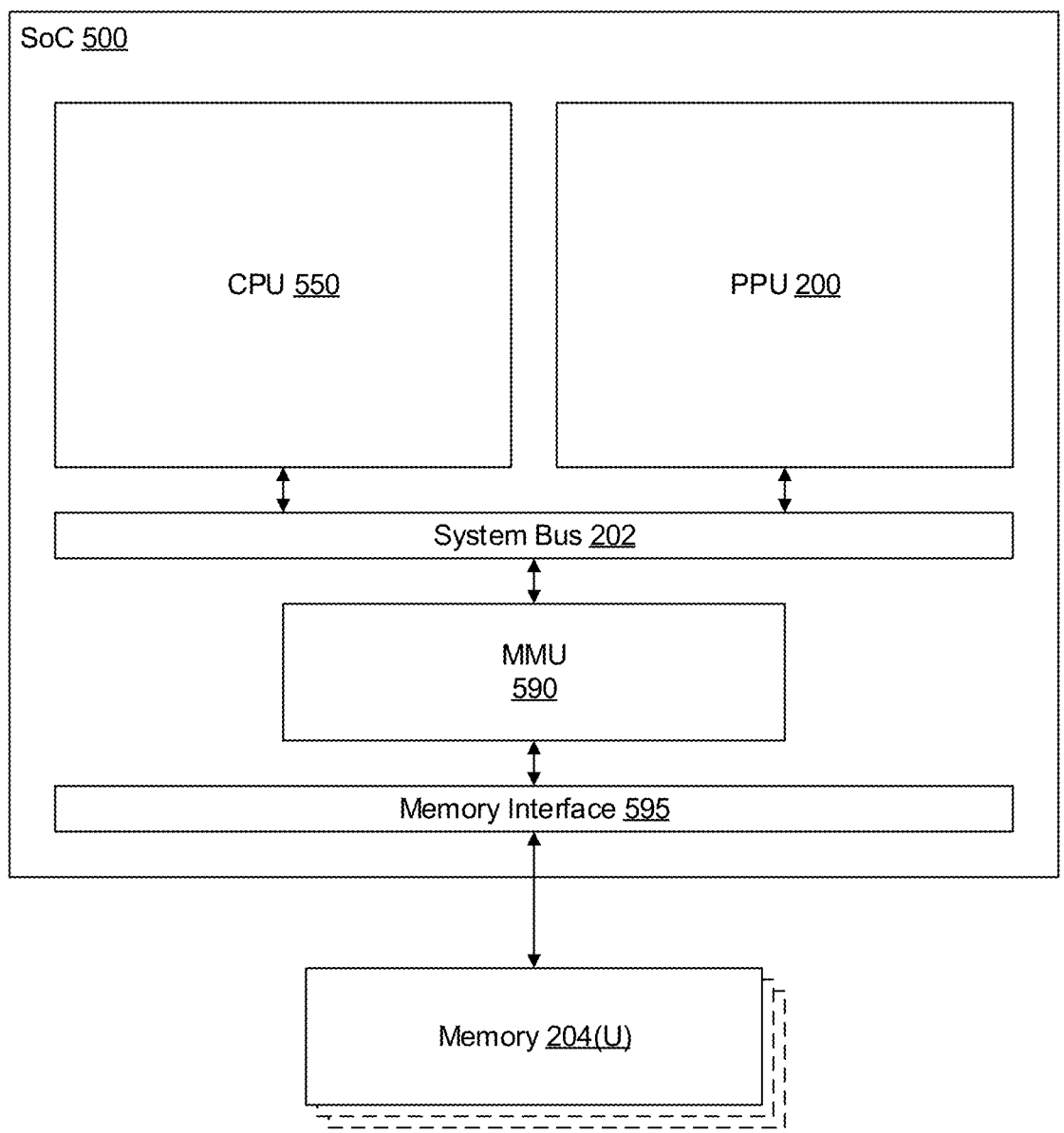
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
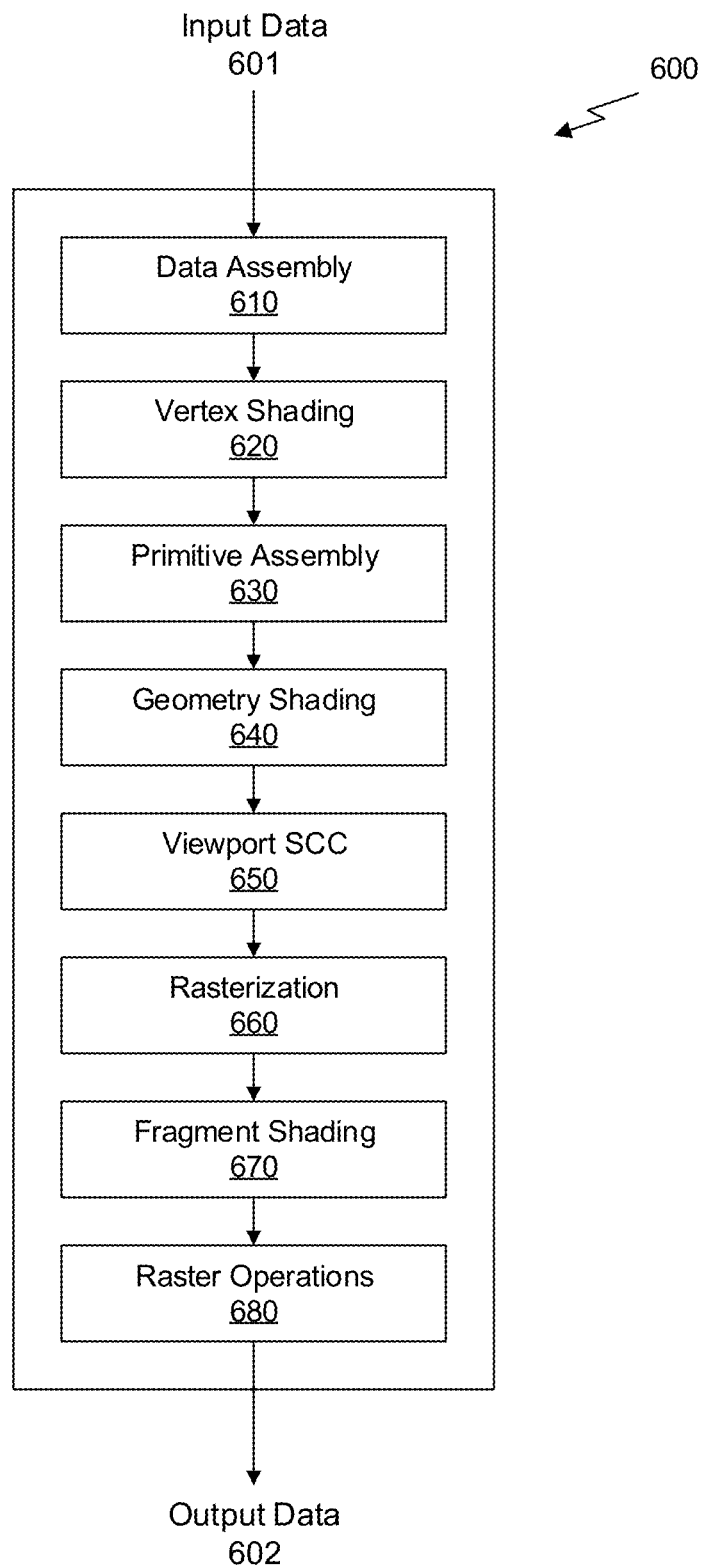
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Figure 7:
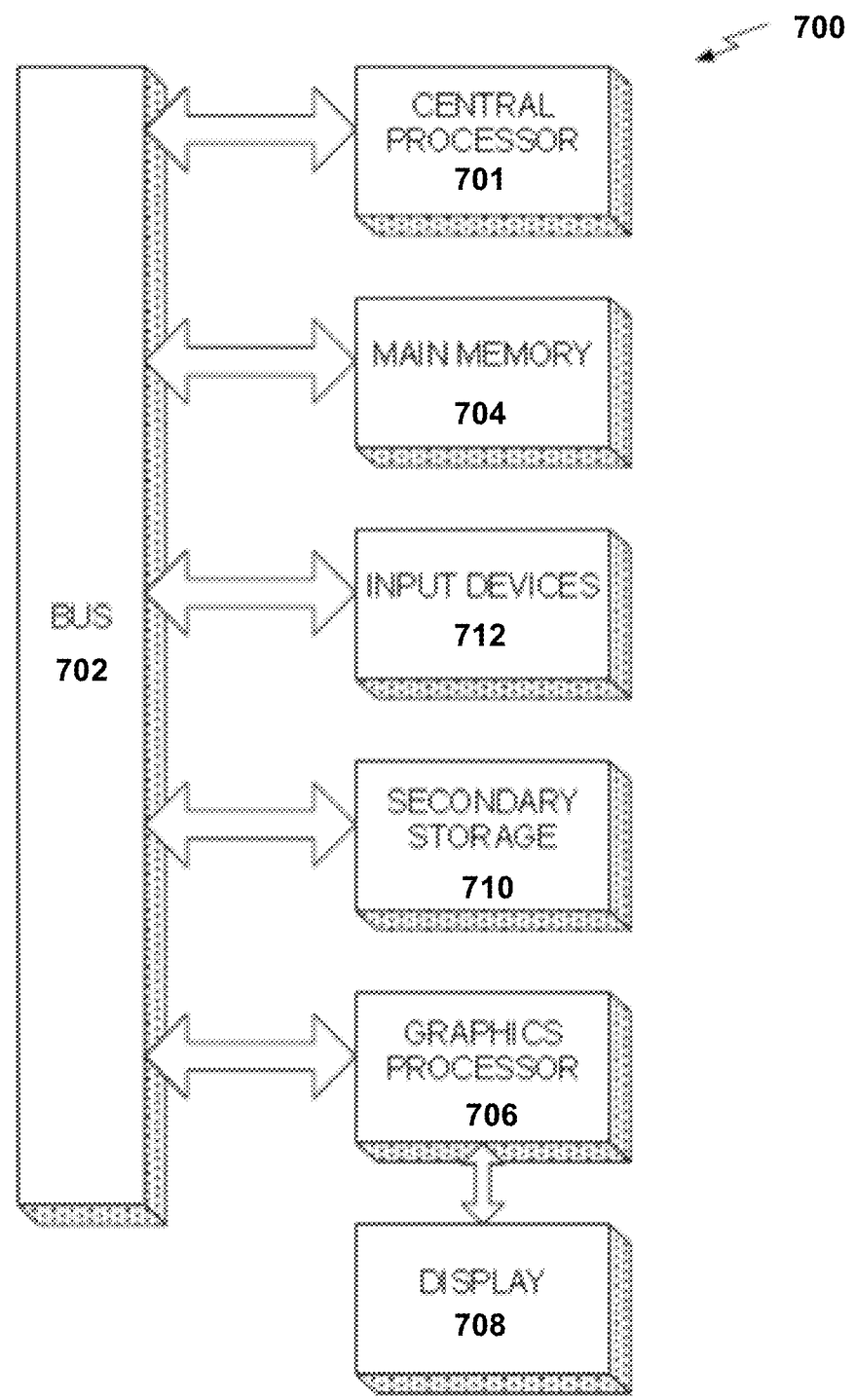
FIG. 7 illustrates an exemplary system in which the various architecture and/or functionality of all embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

Figure 8:
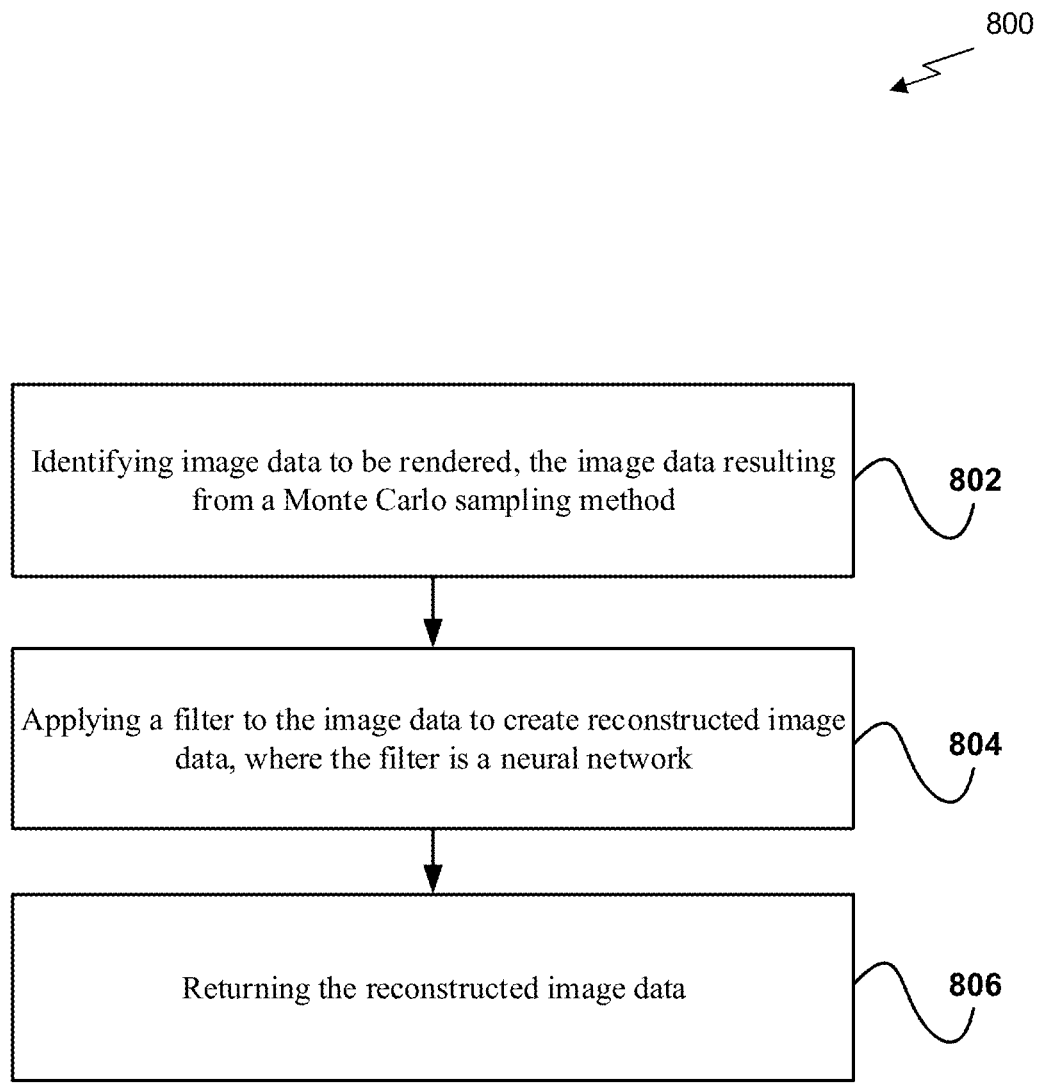
FIG. 8 illustrates a flowchart of an exemplary method for reconstructing image data using a neural network, in accordance with one embodiment.

FIG. 8 illustrates a flowchart of a method 800 for reconstructing image data using a neural network, in accordance with one embodiment. As shown in operation 802, image data to be rendered is identified, the image data resulting from a Monte Carlo sampling method. Additionally, as shown in operation 804, a filter is applied to the image data to create reconstructed image data, where the filter is a neural network. For example, filtering and reconstruction of the image data may be explicitly performed utilizing the neural network (e.g., instead of a cross-bilateral filter, etc.). For example, the neural network may include an autoencoder. In another example, the neural network may implement one or more skip connections. In yet another example, the neural network may implement one or more recurrent layers. Further, as shown in operation 806, the reconstructed image data is returned.

Introduction

Ray and path tracing have recently emerged as the rendering algorithms of choice for visual effects. This has encouraged the development of filtering and reconstruction techniques to reduce the noise inherent in Monte Carlo renderings, but the focus on film-quality results may allow for hundreds to thousands of samples per pixel prior to filtering.

Meanwhile, games have also recently migrated towards physically based shading from more empirical models, but much of the potential increase in realism from this transition hinges on the possibility of sampling light transport paths more flexibly than rasterization allows. Unfortunately, even the fastest ray tracers may only trace a few rays per pixel at 1080p and 30 Hz. While this number doubles every few years the trend is (at least partially) countered by the move towards higher resolution displays and higher refresh rates. It therefore seems likely that a realistic sampling budget for games and other real-time applications will remain on the order of one (short) path per pixel for the foreseeable future. A new general reconstruction technique may be presented that may significantly improve the state-of-the-art in this regime.

Reconstructing global illumination from a single path per pixel may present challenges. Monte Carlo integration of indirect illumination may lead to noisy images at low sampling rates, so that much of the energy is concentrated in a small subset of paths or pixels. The problem may therefore be framed as a reconstruction of the final image (rather than denoising) from these sparse samples since, at prohibitively low sample rates, there may be almost only noise to begin with. This problem may be compounded when trying to obtain a temporal stable result in animation.

In one embodiment, significant modifications may be made to a deep convolutional network in order to address the particular challenges of reconstructing rendered image sequences with extreme Monte Carlo noise. More specifically, adding recurrent connections in a deep autoencoder structure may lead to increased temporal stability, and performing end-to-end training may allow the network to automatically learn how to best utilize auxiliary pixel channels, such as depth and normals, without user interaction or parameter settings.

These advances may allow for interactively generating plausible image sequences with global illumination at extremely low sampling budgets.

Path Tracing

In one embodiment, generating a 1-sample unidirectionally path-traced estimate may be used to create the input to the neural network.

Interactive Path Tracer

In one embodiment, an optimized path tracer may be used to produce noisy input images. Traditional path tracers may shoot rays through each pixel, stochastically scattering according to the profile of the intersected object's reflectance, and continuing recursively until striking a light source. Next event estimation may be used to improve convergence by deterministically connecting each path vertex to a light.

To accelerate visible surface determination, GPUs may be leveraged to rasterize (instead of ray tracing) the first hit point from the camera and store its associated shading attributes in a G-Buffer. More specifically, the hit mesh ID, mesh primitive ID, triangle intersection barycentric coordinates, material ID, world-space position and shading normal, diffuse and specular albedo, and motion vectors may be stored. After this rasterization pass, the path may be traced using a GPU ray tracer. Depth of field and motion blur may not be considered during path tracing, since these effects may be commonly implemented as supplemental post-processes and they may introduce noise in the G-Buffer.

In another embodiment, low-discrepancy sequences (e.g. Halton or Sobol) may be used when sampling the light source and scattering directions, and path space regularization may be applied to glossy and specular materials after scattering. This regularization may significantly reduce the number of sparse high-intensity outliers in glossy reflections, at the cost of a small bias.

The number of indirect bounces may be limited to one for practical interactivity. While it is possible to render images with more light bounces, their contribution to the image typically decays rapidly but their negative impact on rendering time and image variance is more significant. As such, a path tracer may generate only one direct lighting path (camera-surface-light) and one indirect path (camera surface-surface-light) at each pixel. The total input generation cost per pixel may comprises rasterization, three rays, two material evaluations, and one material sampling. In one embodiment, the image may be called a single-sample image to emphasize that one path is traced, even though it has two next event estimations along its way.

Auxiliary Inputs for Reconstruction

In one embodiment, the G-Buffer may contain information about geometry, materials, and light sources of the scene. A subset of this may be made available to the reconstruction by exporting a deep image, which may consist of multiple buffers. In addition to the noisy, high-dynamic range RGB image, the following set of G-Buffer features may be exported from the rasterization pass to the reconstruction algorithm: view-space shading normals (a 2D vector), depth, and the material's roughness. In another embodiment, the input to the reconstruction algorithm may consist of 3+4=7 scalar values per pixel.

The color values may be stored in linear space as 16-bit half precision floating point (FP16) values to retain high dynamic range (HDR). The depth values may be linearized for higher accuracy and may be stored as FP16. The remaining 3 channels may be stored as 8 bpp each. The view space shading normal may be calculated using the camera's projection matrix, and its x and y components may be stored.

The input may be simplified by demodulating the noisy RGB image by the albedo of the directly visible material. By storing this untextured illumination, most of the texture complexity may be removed from the noisy image, which may significantly facilitate training and reducing the required network capacity. After the untextured illumination has been reconstructed, it may be re-modulated by the albedo in order to include the texture detail in the final rendering.

In another embodiment, since directly visible surfaces are sampled only once at each pixel, all of the aforementioned inputs may be prone to image-space aliasing. Antialiasing these inputs may necessitate a higher sampling rate, which may preclude interactive rendering. Applying a screen-space temporal antialiasing technique (TAA) to the reconstructed output image instead may resolve remaining aliasing at a negligible added cost.

Image Sequence Reconstruction with Recurrent Autoencoder

In one embodiment, the image reconstruction algorithm may include a data-driven method that learns a mapping from noisy input image sequences to noise-free output image sequences based on a large number of training pairs, each consisting of an example input sequence and the desired output sequence (i.e. training target).

The reconstruction method may be based on image restoration using a convolutional network with hierarchical skip connections. This architecture may be modified to include subsampling and upsampling stages as well as recurrent connections. Training data may be prepared and an exact loss function may be optimized during training.

Autoencoder with Skip Connections

In one embodiment, the network architecture may include distinct encoder and decoder stages that operate on decreasing and increasing spatial resolutions, respectively. This may provide good results in optical flow estimation, and may also emphasize the connection to denoising autoencoders. Since the layers that operate on the highest spatial resolutions may be the most time consuming, this design may be faster in execution when compared to other architectures, with a negligible decrease in quality (for Gaussian noise). The receptive field of all the deeper layers may be several times larger in the input image, which may allow for the consideration of larger pixel neighborhoods and therefore improved handling of very sparse inputs. Because the network learns a mapping from inputs to outputs, any number of auxiliary inputs may be provided in addition to the color data. The optimization during training may consider all these inputs and may automatically find the best way to use them to disambiguate the color data.

Recurrent Autoencoder for Video Denoising

Recurrent neural networks (RNN) may be used for processing arbitrarily long input sequences. An RNN may include feedback loops that connect the output of the previous hidden states to the current ones, thus retaining important information between inputs. This may make it a good fit to the application for two reasons. First, in order to denoise a continuous stream of images, temporally stable results may need to be obtained. Second, because input images are very sparsely sampled, the recurrent connections may allow for the gathering of more information about the illumination over time.

In order to retain temporal features at multiple scales, fully convolutional recurrent blocks may be included in each encoding stage. In one embodiment, the entire architecture, including the recurrent connections, may be fully convolutional. This may allow training of the network with small fixed-size crops (e.g., 128×128 pixels) and the later application to images of arbitrary size.

In one embodiment, the recurrent blocks may be placed in the encoder part as opposed to the decoder. The reasoning is that the signal may be sparser in the encoder. For example, a recurrent block may be placed at every encoding stage, right before max pooling.

Each recurrent block may consist of three convolution layers with a 3×3-pixel spatial support. One layer may process the input features from the previous layer of the encoder. It may then concatenate the results with the features from the previous hidden state, and may passes it through two remaining convolution layers. The result may become both the new hidden state and the output of the recurrent block. This may provide a sufficient temporal receptive field and, together with the multi-scale cascade of such recurrent blocks, may allow to efficiently track and retain features temporally. The convolution layers in a recurrent block may operate on the same image resolution and the number of features per pixel as the encoding stage it is attached to.

In one embodiment, the output and the hidden state may be represented using a recurrent equation:

$$h_i = O_i = C_{3\times3}(C_{3\times3}(C_{3\times3}(I_i) \frown h_{i-1}))$$

where $C_{3\times3}$ is a convolution kernel with a 3×3-pixel spatial support, $O_i$ is the output, $I_i$ is the current input, $h_i$ is the hidden state for the input i, and $\frown$ is a concatenation operator.

Figure 9:
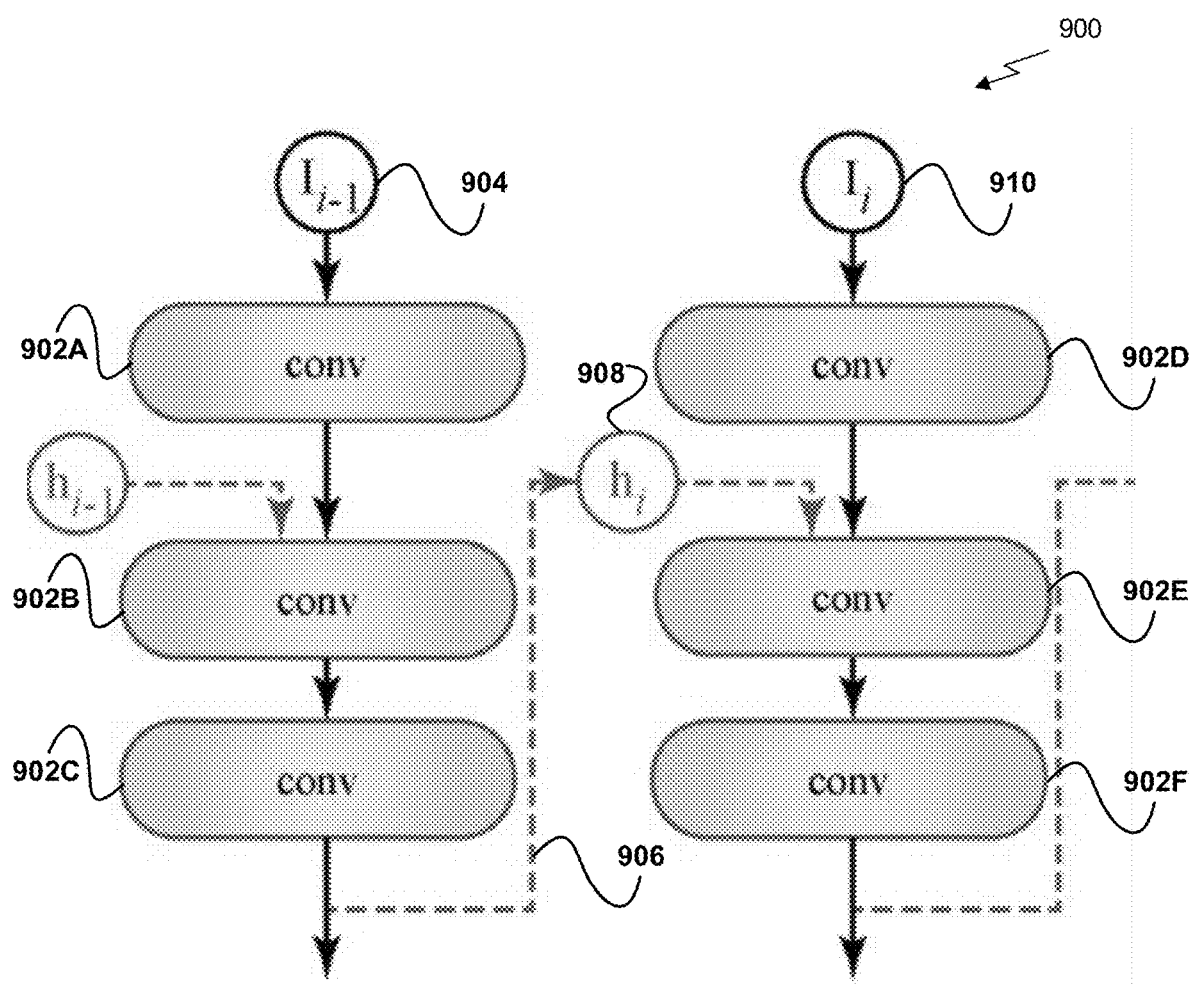
FIG. 9 illustrates an exemplary internal structure of a recurrent RCNN connection, in accordance with one embodiment.

FIG. 9 illustrates an exemplary internal structure 900 of a recurrent RCNN connection, according to one embodiment. As shown, a first plurality of convolutions 902A-C receives a first input 904, and a second plurality of convolutions 902D-F receives a second input 910. A feedback loop 906 provides a hidden, recurrent state 908 from the first plurality of convolutions 902A-C as input to a second plurality of convolutions 902E-F. In this way, information may be retained between inputs of the recurrent RCNN.

Training

One exemplary preparation of training data for the recurrent autoencoder, and details on one exemplary training process, are described below.

Dataset

In one example, a smooth camera fly-through animation may include, for example, 1000 frames for each scene available for training. For every frame, 10 different noisy images may be generated at 1 sample per pixel, as well as the auxiliary features, and the target image for training. By having multiple noisy images, each of these instances of Monte Carlo noise may be asked to lead to the same reconstructed image. This may increase the number of training pairs at a negligible cost compared to creating additional target images. Note that the noisy images may share the auxiliary features because primary rays are rasterized.

In another example, 1024×1024 images may be generated during rendering, while the training may be performed using smaller 128×128 crops that are randomly selected for each training sequence of 7 frames. The beginning of each training sequence may be randomly selected within a fly-through sequence, as well as the fly-through sequence itself. Forward and backward playback may be randomly alternated in order to train the network on various camera movements. The camera may also be randomly "stalled" in the training sequence by changing the noisy image to a different seed, while keeping the frame and the target image fixed.

In addition, random rotations of the training sequence by 90=180=270 degrees may be used to train on more movement directions. A random modulation in range [0,2] may be applied separately to each color channel. This may force the network to better learn the linear input-target color relation, as well as the independence of the channels.

Network

We train for 500 epochs with learning rate 0.001 and decay rates 1=0.9 and 2=0.99. The learning rate may be ramped up tenfold using a geometric progression during the first 10 training epochs, and then decreased according to $1/\sqrt{t}$ schedule, where t is training time. A minibatch size of 4 sequences may be used, and each epoch may randomize the order of training data. All parameters may be initialized, and leaky ReLU activation with α=0.1 may be used in all layers except the last one, which may use linear activation. Max pooling may be used for subsampling and nearest neighbor filtering for upsampling.

In total, there may be 36 convolution layers in the network: 18 in the feedforward path and 3 within each of the 6 RCNN blocks. Sequences of 7 consecutive frames may be used to provide enough temporal context during training. The recurrent blocks may be trained by back propagating through time, where the feed-forward subparts of the RNN are replicated to unroll the recurrence loops.

The output feature count may be set to 32 per pixel in the first stage of the encoder, and then the number may be multiplied by ⅔ after every subsampling operation. This may lead to a fixed-rate compression by a factor of 4/(⅔)=3 after every subsampling. Therefore, information lost at every stage may get reintroduced through the skip connections. The decoder part may then amplify the amount of data by 3× after every upsampling.

Loss Function

A loss function may define how the error between network outputs and training targets is computed during training. One exemplary loss function used in image restoration is $L_2$, which is the mean squared error between the predicted image P and the target image T. However, using $L_1$ loss instead of $L_2$ may reduce splotchy artifacts from reconstructed images.

Another exemplary first loss term may include a spatial $L_1$ loss, denoted as $\mathcal{L}_s$ for a single image in the temporal training sequence:

$$\mathcal{L}_s = \frac{1}{N}\sum_i^N |P_i - T_i|,$$

Where $P_i$ and $T_i$ are the ith pixel of the predicted and target image correspondingly. The image may also be flattened by raising all color channels to the power before computing the loss. A value of 1/2.2 may be close to the perceptual gamma correction, however, a more aggressive value of 0.2 may allow to penalize the error in the dark regions of the image even more efficiently.

The $L_1$ spatial loss may provide a good overall image metric that is tolerant to outliers. In order to further penalize the differences in fine details, such as edges, a gradient-domain L1 loss may also be used:

$$\mathcal{L}_g = \frac{1}{N}\sum_i^N \left( \left| \frac{\partial P_i}{\partial x} - \frac{\partial T_i}{\partial x} \right| + \left| \frac{\partial P_i}{\partial y} - \frac{\partial T_i}{\partial y} \right| \right),$$

where the derivatives may be computed with finite differencing using a single pixel offset along x and y correspondingly.

These losses may minimize the error for each image in isolation. However, they may not penalize temporal incoherence (e.g., flickering between frames), and may not encourage the optimizer to train the recurrent connections to pass more data across frames. Therefore, a temporal $L_1$ loss $\mathcal{L}_t$ may be introduced:

$$\mathcal{L}_t = \frac{1}{N}\sum_i^N \left( \left| \frac{\partial P_i}{\partial t} - \frac{\partial T_i}{\partial t} \right| \right),$$

where a temporal derivative $\partial P_i/\partial t$ for an ith image pixel may be computed using finite differencing in time between the ith pixels of the current and the previous image in the temporal training sequence. A weighted combination of these three losses may be used as the final training loss:

$$\mathcal{L} = w_s \mathcal{L}_s + w_g \mathcal{L}_g + \mathcal{L}_t \mathcal{L}_t,$$

where $w_{s/g/t}$ are the adjustable weights that control the contribution of each loss. The weighted loss may be used in training with weights $w_{s/g/t}$=0.8/0.1/0.1 correspondingly.

In one embodiment, the frames later in the sequence may be assigned a higher weight to incentivize the temporal training of RNN blocks. For example, Gaussian curve may be used to modulate $w_{s/g/t}$: for a sequence of 7 images, (0.011, 0.044, 0.135, 0.325, 0.607, 0.882, 1) may be used.

To verify that the combined loss leads to an improvement over the spatial-only loss $\mathcal{L}_s$, the structural similarity metric (SSIM) may be measured on a validation sequence after 100 epochs of training. SSIM may show an improvement (e.g., from 0.7815 for $\mathcal{L}_s$ to 0.7647 for the combined loss).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing spatiotemporal filtering, comprising:
identifying image data to be rendered, the image data including:
color data, and
one or more auxiliary features that include at least one of one or more view-space shading normals, one or more depth values, or one or more roughness values;
reconstructing the image data to create reconstructed image data, utilizing a filter including a neural network that processes the image data based on the one or more auxiliary features, the neural network having:
one or more skip connections, and
one or more recurrent layers that retain, at least in part, the one or more auxiliary features unchanged; and
returning the reconstructed image data and the unchanged one or more auxiliary features.

2. The method of claim 1, wherein the image data is created as a result of a predetermined process, the predetermined process including one or more of:
low light photography;
low light video recording;
a Monte Carlo sampling method;
photography that produces RGB and depth information; and
depth-only cameras.

3. The method of claim 1, wherein the image data has a number of samples per pixel (spp) below a predetermined threshold.

4. The method of claim 1, wherein the one or more auxiliary features includes the one or more view-space shading normals.

5. The method of claim 1, wherein the one or more auxiliary features includes the one or more depth values.

6. The method of claim 1, wherein the one or more auxiliary features includes the one or more roughness values.

7. The method of claim 1, wherein the neural network includes a plurality of convolution layers.

8. The method of claim 1, wherein the neural network includes a plurality of encoder layers and corresponding decoder layers, and a first skip connection within the neural network enables a reconstruction process to jump from a first encoder layer directly to a corresponding decoder layer, thereby skipping over one or more encoder and decoder layers within the neural network.

9. The method of claim 1, wherein the one or more recurrent layers include a recurrent convolutional neural network (RCNN).

10. The method of claim 1, wherein the one or more recurrent layers link a layer to itself within the neural network.

11. The method of claim 1, further comprising training the neural network, utilizing a data set including a plurality of input/output pairs.

12. The method of claim 11, wherein a loss function is utilized during the training of the neural network.

13. The method of claim 1, wherein the image data includes a first frame of a sequence of frames, and wherein the one or more auxiliary features used during the reconstructing of the first frame is stored as a hidden, recurrent state, which is then accessed during a reconstruction of a second frame of the sequence of frames of the image data within an RCNN, utilizing a feedback loop of the RCNN.

14. A system comprising:
a processor that is configured to:
identify image data to be rendered, the image data including:
color data, and
one or more auxiliary features that include at least one of one or more view-space shading normals, one or more depth values, or one or more roughness values;
reconstruct the image data to create reconstructed image data, utilizing a filter including a neural network that processes the image data based on the one or more auxiliary features, the neural network having:
one or more skip connections, and
one or more recurrent layers that retain, at least in part, the one or more auxiliary features unchanged; and
return the reconstructed image data and the unchanged one or more auxiliary features.

15. The system of claim 14, wherein the image data is created as a result of a predetermined process, the predetermined process including one or more of:
low light photography;
low light video recording;
a Monte Carlo sampling method;
photography that produces RGB and depth information; and
depth-only cameras.

16. The system of claim 14, wherein the image data has a number of samples per pixel (spp) below a predetermined threshold.

17. The system of claim 14, wherein the one or more auxiliary features includes the one or more view-space shading normals.

18. A method for performing spatiotemporal filtering, comprising:
identifying image data to be rendered, the image data resulting from a Monte Carlo sampling method and the image data including:
color data, and
one or more auxiliary features that include at least one of one or more view-space shading normals, one or more depth values, or one or more roughness values;
applying a filter to the image data to create reconstructed image data, where the filter is a neural network that processes the image data based on the one or more auxiliary features, the neural network having:
one or more skip connections, and
one or more recurrent layers that retain, at least in part, the one or more auxiliary features unchanged; and
returning the reconstructed image data and the unchanged one or more auxiliary features.

19. The method of claim 1, wherein the image data and the one or more auxiliary features are identified from a deep image consisting of multiple buffers storing the image data and the one or more auxiliary features.

20. The method of claim 11, wherein the neural network is trained by:
demodulating an input image of an input and output pair to remove texture from the input image;
processing the demodulated input image to reconstruct the demodulated input image; and
generating a final rendering by re-modulating the reconstructed demodulated input image to include the texture.

* * * * *